United States Patent Office 3,534,105
Patented Oct. 13, 1970

3,534,105
PRODUCTION OF SULFOXONIUM SALTS BY THE OXIDATION OF SULFONIUM SALTS
Harry Distler and Friedrich Fuchs, Ludwigshafen (Rhine), and Ernst-Heinrich Pommer, Limburgerhof, Pfalz, Germany, assignors to Badische Anilin- & Soda-Fabrik Aktiengesellschaft, Ludwigshafen (Rhine), Germany
No Drawing. Filed Sept. 26, 1967, Ser. No. 670,780
Int. Cl. A01n 9/14; C07c 161/00
U.S. Cl. 260—607          7 Claims

ABSTRACT OF THE DISCLOSURE

The production of sulfoxonium salts in which sulfonium salts having the formula:

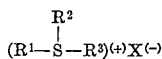

in which $R^1$ denotes an alkyl radical having eight to thirty carbon atoms, $R^2$ denotes an aliphatic, cycloaliphatic, araliphatic or aromatic radical having up to eight carbon atoms, $R^3$ denotes an aliphatic, cycloaliphatic, araliphatic or aromatic radical having up to eight carbon atoms and X denotes an anion are reacted with hydrogen peroxide in the presence of an inert solvent at elevated temperature. Sulfoxonium salts are used as rewetting agents.

---

This invention relates to a process for the production of sulfoxonium salts from sulfonium salts.

It is known from Bulletin de la Société Chimique Belge, vol. 74, 450 (1965), that sulfoxonium salts are obtained from sulfoxides by reaction with sulfones. The process has the disadvantage that sulfones which are not easily accessible have to be used. It is also known from the Journal of Organic Chemistry, vol. 23, 1563 (1958), that sulfoxonium salts are obtained from sulfoxides by reaction with alkylating agents. The constitution of the reaction products depends, however, on the alkylating agent, a fact which limits the applicability of this reaction.

It is an object of this invention to provide a process for the production of sulfoxonium salts from easily accessible starting materials. Another object of this invention is to provide a process for the production of sulfoxonium salts in which the choice of substituents is less limited than in the prior art.

These and other objects are achieved in accordance with this invention by reacting sulfonium salts with hydrogen peroxide in the presence of an inert solvent at elevated temperature.

The new process has the advantage that the substituents of the sulfonium salts may be chosen at will. Moreover, readily accessible starting materials may be used.

Preferred sulfonium salts which may be used in the reaction have the general formula:

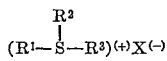

in which $R^1$ denotes an alkyl radical having eight to thirty, preferably ten to twenty, carbon atoms, $R^2$ denotes an aliphatic radical, cycloaliphatic radical, araliphatic radical or aromatic radical having up to eight carbon atoms, $R^3$ denotes an aliphatic radical, cycloaliphatic radical, araliphatic radical or aromatic radical having up to eight carbon atoms, and X denotes an anion, preferably an anion of a strong mineral acid, e.g. a halogen anion, a sulfate anion or a phosphate anion. In particularly preferred sulfonium salts, $R^2$ and $R^3$ each denotes an aliphatic radical having one to four carbon atoms which may be saturated or unsaturated, i.e. may contain up to three olefinic double bonds, or are or contain aryl radicals. They may also bear substituents which are inert under the reaction conditions, such as hydroxyl groups or alkyl radicals having one to four carbon atoms and attached via ether bridges, or polyether groups, such as may be prepared by polymerization of ethylene oxide. Starting materials in which $R^1$ and $R^2$ denote β-hydroxyethyl or β-hydroxypropyl radicals are of particular importance. Examples of suitable compounds are: octylmethylcyclohexylsulfonium chloride, decyl-n-butylbenzylsulfonium bromide, tetradecyl-n-octylphenylsulfonium sulfate, stearyldi-β-hydroxyethylsulfonium sulfate, and palmityl-bis-(β-methoxyethyl)-sulfonium sulfate. $C_{10}$ to $C_{20}$ alkyl-bis-(β-hydroxyethyl)-sulfonium salts are of particular significance.

Hydrogen peroxide is used for the reaction, advantageously in aqueous solution in a concentration of 5 to 50%, preferably from 10 to 50%, by weight. It is also possible to prepare the hydrogen peroxide in situ, for example by reacting an alkali metal peroxide with an acid. The sulfonium salts and hydrogen peroxide are advantageously used in the molar ratio. It is preferably to use hydrogen peroxide in excess, for example of up to 50 mole percent.

The reaction is advantageously carried out at temperatures of from 20° to 100° C., preferably at from 50° to 100° C.

The reaction is carried out in the presence of inert solvents. It is preferred to use water as the inert solvent. It is however also possible to use organic solvents which are inert under the reaction conditions, which are liquid at the reaction temperatures and which have a boiling point of from 40° to 150° C., such as alcohols, for example methanol or ethanol. To increase the rate of reaction, it is advantageous to carry out the reaction in the presence of catalysts, such as molybdic acid or tungstic acid, in amounts of 0.1 to 1% by weight with reference to the amount of hydrogen peroxide used.

The process according to the invention may be carried out for example by reacting a sulfonium salt, preferably in aqueous solution, with hydrogen peroxide in the said concentration and in the said ratio at the said temperatures. The resulting aqueous solutions of sulfoxonium salt are preferably used in the form in which they are obtained.

The sulfoxonium salts prepared according to this invention are suitable as textile assistants and pest control agents. Some of the sulfoxonium salts prepared by the process of the invention have valuable properties in special fields of application, particularly the $C_{10}$ to $C_{20}$ alkyl-bis-(β-hydroxyethyl)-sulfoxonium salts. They are distinguished by a particularly good rewetting power for textiles as compared with conventional rewetting agents. Moreover they have outstanding bactericidal and fungicidal efficiency. The fungicidal and bactericidal effectiveness may be seen from the following Table in which the dilution at which sulfoxonium salts (A=bis-(β-hydroxyethyl)-$C_{11}$-$C_{15}$-alkylsulfoxonium sulfate) still prevent the growth of fungi and bacteria as compared with known fungicides and bactericides (B=N-(3-chloroalkyl)-hexaminium chloride).

TABLE

|  | A | B |
| --- | --- | --- |
| Staphylococcus aureus | 1:80,000 | 1:4,000 |
| Escherichia coli | 1:20,000 | 1:2,000 |
| Aspergillus niger | 1:20,000 | 1:1,500 |

The invention is further illustrated by the following examples.

EXAMPLE 1

140 parts of bis-(β-hydroxyethyl)-$C_{11}$-$C_{15}$-alkylsulfonium sulfate is mixed with 50 parts of water while stirring at 30° to 40° C. and then 45 parts of a 30 wt. percent solution of hydrogen peroxide is metered in. 235 parts of bis($\beta$-hydroxyethyl) - $C_{11}$–$C_{15}$ - alkylsulfoxonium sulfate is obtained as a colorless paste having a solids content of 63% by weight.

EXAMPLE 2

500 parts of bis-($\beta$-hydroxyethyl)-$C_{12}$-alkylsulfonium sulfate is reacted with 157 parts of 30% by weight hydrogen peroxide solution in 500 parts of water at 35° to 40° C. while stirring well. The reaction is over after four to six hours. 1157 parts of bis-($\beta$-hydroxyethyl)-$C_{12}$-alkylsulfoxonium sulfate having a solids content of 45.5% by weight is obtained.

We claim:

1. A process for the production of sulfoxonium salts which comprises reacting a sulfonium salt having the general formula:

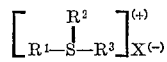

in which $R^1$ denotes an alkyl radical having ten to twenty carbon atoms, $R^2$ denotes a $\beta$-hydroxyethyl radical or a $\beta$-hydroxypropyl radical, $R^3$ denotes a $\beta$-hydroxyethyl radical or a $\beta$-hydroxypropyl radical, and X denotes the anion of a strong mineral acid, with aqueous hydrogen peroxide solution of 5 to 50% by weight strength in a molar ratio of 1:1 in the presence of an inert solvent at a temperature of from 20° to 100° C.

2. A process as claimed in claim 1 in which hydrogen peroxide is used in an excess of up to 50 mole percent.

3. A process as claimed in claim 1 carried out at a temperature of from 50° to 100° C.

4. A process as claimed in claim 1 in which water is used as the solvent.

5. A process as claimed in claim 1 wherein 0.1 to 1% by weight (with reference to hydrogen peroxide) of molybdic acid is used as a catalyst.

6. A process as claimed in claim 1 wherein 0.1 to 1% by weight (with reference to hydrogen peroxide) of tungstic acid is used as a catalyst.

7. A process for the production of sulfoxonium salts which comprises reacting a sulfonium salt having the general formula:

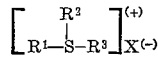

in which $R^1$ denotes an alkyl radical having eight to thirty carbon atoms, $R^2$ denotes cyclohexyl, benzyl or phenyl and $R^3$ denotes alkyl of 1–8 carbon atoms or both $R^2$ and $R^3$ denote $\beta$-methoxyethyl and X denotes the anion of a strong mineral acid, with aqueous hydrogen peroxide solution of 5 to 50% by weight strength in a molar ratio of 1:1 in the presence of an inert solvent at a temperature of from 20° to 100° C.

References Cited

UNITED STATES PATENTS 3,196,184    7/1965    Berry _____ 260—607

OTHER REFERENCES

Hoyben-Weyl: "Met. der Org. Chemie," vol. IX (1955), pp. 211–213.

CHARLES B. PARKER, Primary Examiner

D. R. PHILLIPS, Assistant Examiner

U.S. Cl. X.R.

424—335